(12) United States Patent
Becker

(10) Patent No.: US 7,741,978 B2
(45) Date of Patent: Jun. 22, 2010

(54) SYSTEM AND METHOD FOR PROVIDING LOCATION-BASED ENTERTAINMENT

(75) Inventor: Emily Becker, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 294 days.

(21) Appl. No.: 11/897,756

(22) Filed: Aug. 31, 2007

(65) Prior Publication Data

US 2009/0058683 A1    Mar. 5, 2009

(51) Int. Cl.
*G08G 1/123* (2006.01)
(52) U.S. Cl. ............... 340/995.24; 340/539.13; 340/995.19; 340/996; 701/211; 701/213
(58) Field of Classification Search .... 340/988–995.27, 340/539.11–539.13; 701/201–213
See application file for complete search history.

(56) References Cited

U.S. PATENT DOCUMENTS

| 5,614,898 | A | * | 3/1997 | Kamiya et al. | ......... 340/995.24 |
| 5,627,547 | A | | 5/1997 | Ramaswamy et al. | |
| 5,648,768 | A | * | 7/1997 | Bouve | ......... 340/988 |
| 5,767,795 | A | * | 6/1998 | Schaphorst | ......... 340/988 |
| 5,948,040 | A | | 9/1999 | Delorme et al. | |
| 6,085,148 | A | * | 7/2000 | Jamison et al. | ......... 701/211 |
| 6,360,167 | B1 | * | 3/2002 | Millington et al. | ......... 701/211 |
| 2002/0093435 | A1 | | 7/2002 | Baron | |
| 2004/0078813 | A1 | | 4/2004 | Kobuya et al. | |
| 2004/0098191 | A1 | * | 5/2004 | Becker et al. | ......... 701/200 |
| 2005/0122236 | A1 | * | 6/2005 | Brauer et al. | ......... 340/995.24 |
| 2007/0050191 | A1 | * | 3/2007 | Weider et al. | ......... 704/275 |

FOREIGN PATENT DOCUMENTS

WO    WO 99/60548    11/1999

OTHER PUBLICATIONS

"GoCar—The Cure for the Common Tour. Exciting sightseeing activities in San Francisco, San Diego and Miami!" May 14, 2008 <http://www.gocartours.com/>.

* cited by examiner

*Primary Examiner*—Brent Swarthout
(74) *Attorney, Agent, or Firm*—Farjami & Farjami LLP

(57) ABSTRACT

There is disclosed a system and method for providing location-based entertainment. In one embodiment, a device capable of providing location-based entertainment comprises a navigational interface module configured to receive navigational data, an entertainment selection module configured to utilize the navigational data to generate location-based entertainment content for a user, and a presentation module configured to present the location-based content to the user. The system may also include a position finding module and a routing module. In one embodiment, a method for providing location-based entertainment comprises identifying a present location of a mobile user, identifying a destination of the mobile user, determining a travel route of the mobile user based on the present location and the destination of the mobile user, providing navigational data according to the travel route, generating a location-based entertainment content for a user utilizing the navigational data, and presenting the location-based content to the user.

15 Claims, 4 Drawing Sheets

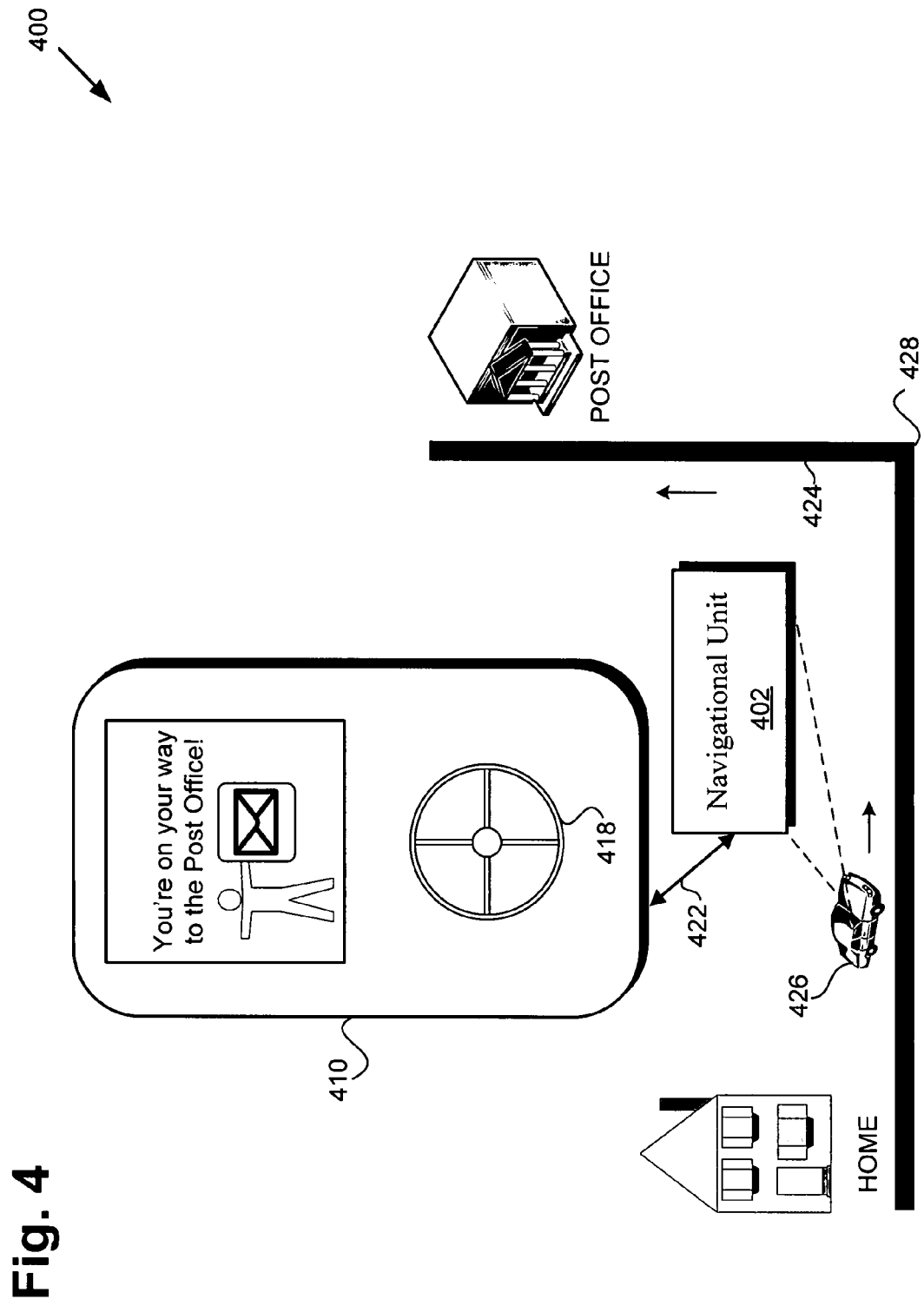

SYSTEM AND METHOD FOR PROVIDING LOCATION-BASED ENTERTAINMENT

BACKGROUND OF THE INVENTION

1. Field of the Invention

The present invention relates generally to mobile communications. More particularly, the present invention relates to mobile entertainment.

2. Background Art

Mobile navigational devices, such as handheld global positioning system (GPS) receivers and vehicle navigation systems, for example, have made location finding and reliable route planning easier to perform than ever before. Moreover, location finding capabilities are increasingly finding their way onto common mobile devices, such as mobile telephones and personal digital assistants (PDAs), making those navigational features widely available to consumers. Whether, for instance, seeking to identify a present location, or selecting a route to a desired destination, users of mobile devices having navigational functionality may now utilize those advantages to make getting around easier, less stressful, and even safer than in the past.

Although capable of providing substantially continuous monitoring of location or route progression, navigational devices are typically utilized primarily for travel planning, and then almost only when there is uncertainty as to a location or route. For example, during an automobile trip in which the driver of a car equipped with a navigation system transports several passengers to a familiar destination, the navigation system may not be utilized at all. Even when the destination is unfamiliar, the navigation system may be used by the driver, but is unlikely to be utilized by the vehicle passengers.

Travel can be tedious, however, and the need to provide travelers with diversion and entertainment during a trip has long been recognized. This may be particularly true for lengthy road trips, or for travel involving delays due to traffic congestion, for example. In the past, the tedium of travel has been alleviated through various means. First radio, then media devices such as cassette, 8-track, and CD players, followed more recently by satellite radio, have all been implemented to alleviate the stresses and frustrations of vehicular travel.

The tedium of travel can exact an especially high toll on the patience and enthusiasm of children, who may be traveling along a route over which they have no control, to a destination with which they are unfamiliar. The frustrations and unhappiness suffered by children during travel are readily transferred to their parents, who may have selected a particular route or destination, during a family vacation for example, expressly to provide their children with an enjoyable and intellectually broadening experience. In an effort to provide children passengers with a more engaging form of entertainment and diversion than the simple audio stimulation provided by radio and the other forms of entertainment described previously, many vehicles are now also equipped with DVD players to provide additional visual entertainment.

Unfortunately, the forms of entertainment traditionally provided to relieve the unpleasant aspects of travel may be seen to emphasize distraction from that unpleasantness, rather than diversion through engagement in the positive aspects of a particular trip. While this approach may be largely unobjectionable for certain types of travel, a routine commute for example, it may do a disservice when a route, a destination, or points of interest along the way provide some of the motivation for the trip itself. For the family vacation road trip mentioned earlier, for example, entertainment providing diversion from the mundane aspects of the trip, that at the same time immerses the travelers in the intellectually broadening details of locations along the travel route, would be desirable.

SUMMARY OF THE INVENTION

A system and method for providing location-based entertainment, substantially as shown in and/or described in connection with at least one of the figures, as set forth more completely in the claims.

BRIEF DESCRIPTION OF THE DRAWINGS

The features and advantages of the present invention will become more readily apparent to those of ordinarily skill in the art after reviewing the following detailed description and accompanying drawings, wherein:

FIG. 4 shows a diagram for another exemplary route during which the system of FIG. 1 can be utilized to provide location-based entertainment, according to one embodiment of the present invention.

DETAILED DESCRIPTION OF THE INVENTION

The present application is directed to a system and method for providing location-based entertainment. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
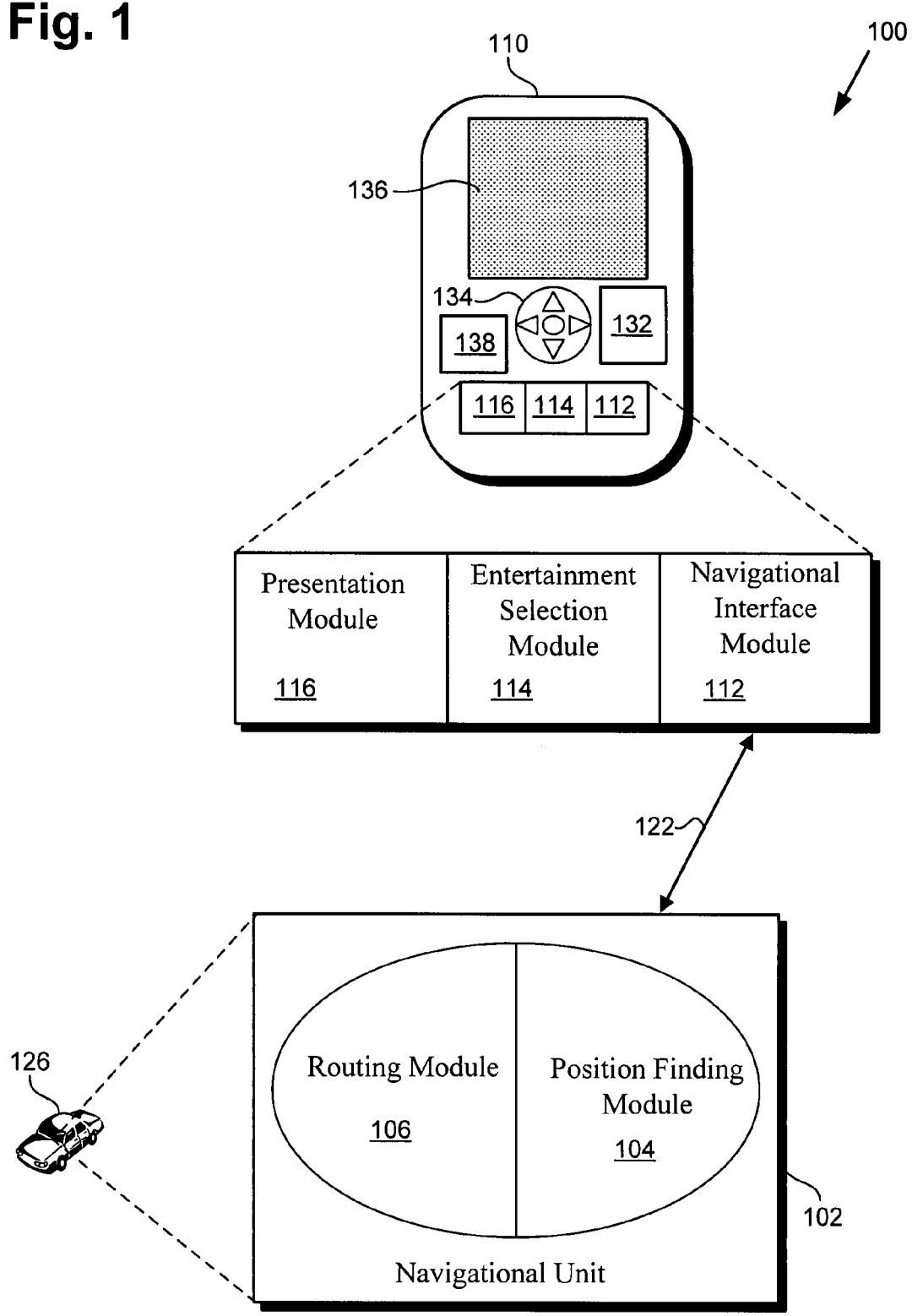
FIG. 1 is a diagram showing an exemplary system for providing location-based entertainment, in accordance with one embodiment of the present invention.

FIG. 1 is a diagram showing an exemplary system for providing location-based entertainment, in accordance with one embodiment of the present invention. System 100, in FIG. 1, includes navigational unit 102, such as might be utilized by automobile 126 equipped with a vehicle navigation system, and entertainment unit 110 capable of providing location-based entertainment. Entertainment unit 110 comprises controller 132, user interface 134, display 136, and memory 138, in addition to navigational interface module 112, entertainment selection module 114, and presentation module 116. Entertainment unit 110 receives navigational data from navigational unit 102 through communication link 122. Navigational unit 102 includes position finding module 104 and routing module 106. Navigational data is received as input to navigational interface module 112, and entertainment selection module 114 utilizes that data as part of location-based entertainment for presentation by presentation module 116. Properly configured, entertainment unit 110 may be any mobile electronic device suitable for use in presenting audio, video, or graphical media, including a mobile telephone, personal digital assistant (PDA), digital media player, portable computer, or portable gaming console, for example.

As shown in FIG. 1, entertainment unit 110 and navigational unit 102 are separate components connected via communication link 122, which may be a wired or wireless connection. In one embodiment, however, entertainment unit 110 additionally comprises position finding module 104, which may include a global positioning system (GPS) receiver, for example. In another embodiment, entertainment unit 110 can comprise routing module 106. In yet another embodiment, entertainment unit 110 is an entirely integrated system supporting navigational functionality as well as being capable of providing location-based entertainment. In such embodiment, entertainment unit 110 may comprise both position finding module 104 and routing module 106, in addition to navigational interface module 112, entertainment selection module 114, and presentation module 116, for example.

Routing module 106 can comprise a map database for instance, which, in conjunction with positional data provided by a position finding device, such as position finding module 104, can provide route guidance from a present location to a desired destination. For example, navigational unit 102 comprising position finding module 104 and routing module 106 can correspond to elements of a vehicle navigation system, as shown in FIG. 1.

According to one embodiment, entertainment unit 110 receives navigational data from navigational unit 102, via communication link 122. The navigational data is received as input by navigational interface module 112, and may comprise a present location, routing information, or both, for example. Navigational interface module 112 is configured to accept navigational data as input and make the information content of that data available to entertainment selection module 114.

In one embodiment, entertainment selection module 114 may utilize the navigational data to generate location-based entertainment content according to one or more locations of a user of entertainment unit 110, such as using the navigational data as selection criteria in selecting entertainment content specific one or more locations of a user of entertainment unit 110. The term "location," as it is used in the present application, refers to a unique spatial position and may correspond to a present position, past position, future position, or virtual position of a user of entertainment unit 110. For example, a present location of a user of entertainment unit 110 corresponds to a present spatial position of entertainment unit 110, and may be determined in conjunction with position finding module 104, which may comprise, for instance, a GPS receiver. As a further example, a past location of a user of entertainment unit 110 may correspond to a previous position on a travel route determined by routing module 106. Similarly, a future location may correspond to a projected position on a travel route, such as a designated destination, for example. Moreover, a virtual location may correspond to a position on a hypothetical travel route, or to a hypothetical destination, designated, for instance, during travel planning.

Characterization of the entertainment selected by entertainment selection module 114 as being location-based, signifies that the location, and/or points of interest in its proximity, determine the subject matter or context of the selected entertainment. For example, a travel route beginning in San Diego, Calif., and having Los Angeles, Calif., as its destination, may pass through Anaheim, Calif. Designation of Anaheim, Calif. as a selection criteria location, which could constitute a present location, past location, or future location, depending upon the progression of travel, might result in selection of entertainment devoted to Anaheim point of interest Disneyland, for example, or use Disney characters to convey an instructional message. In one embodiment, entertainment selection module 114 may include an entertainment database (not shown) from which appropriate location-based entertainment can be selected. In other embodiments, entertainment unit 110 may comprise a mobile communication device, in which case location-based entertainment may be selectively downloaded from an entertainment content server, or comprise streaming media, for example.

The location-based entertainment provided by entertainment unit 110 may include an interactive presentation, an audio presentation, a game, or a multimedia story, for example. According to the embodiment of FIG. 1, the location-based entertainment is displayed using presentation module 116. Presentation module 116 may comprise any output system suitable for presentation of the selected entertainment, and may comprise for instance, a speaker or other audio projection unit, or a video screen. Alternatively, presentation module 116 may be configured to utilize an existing display feature of entertainment unit 110 for presentation of the selected entertainment, such as display 136, in FIG. 1. Because the entertainment provided by entertainment unit 110 may be interactive, entertainment unit includes user interface 134 to allow a device user to enter a response. Such an input means might include a keypad, a mouse, a joystick or touch screen, for example. In one embodiment, remote entertainment unit 110 may be used in conjunction with a virtual steering accessory, providing a user of entertainment unit 110 with an opportunity to simulate traveling to a designated destination.

Figure 2:
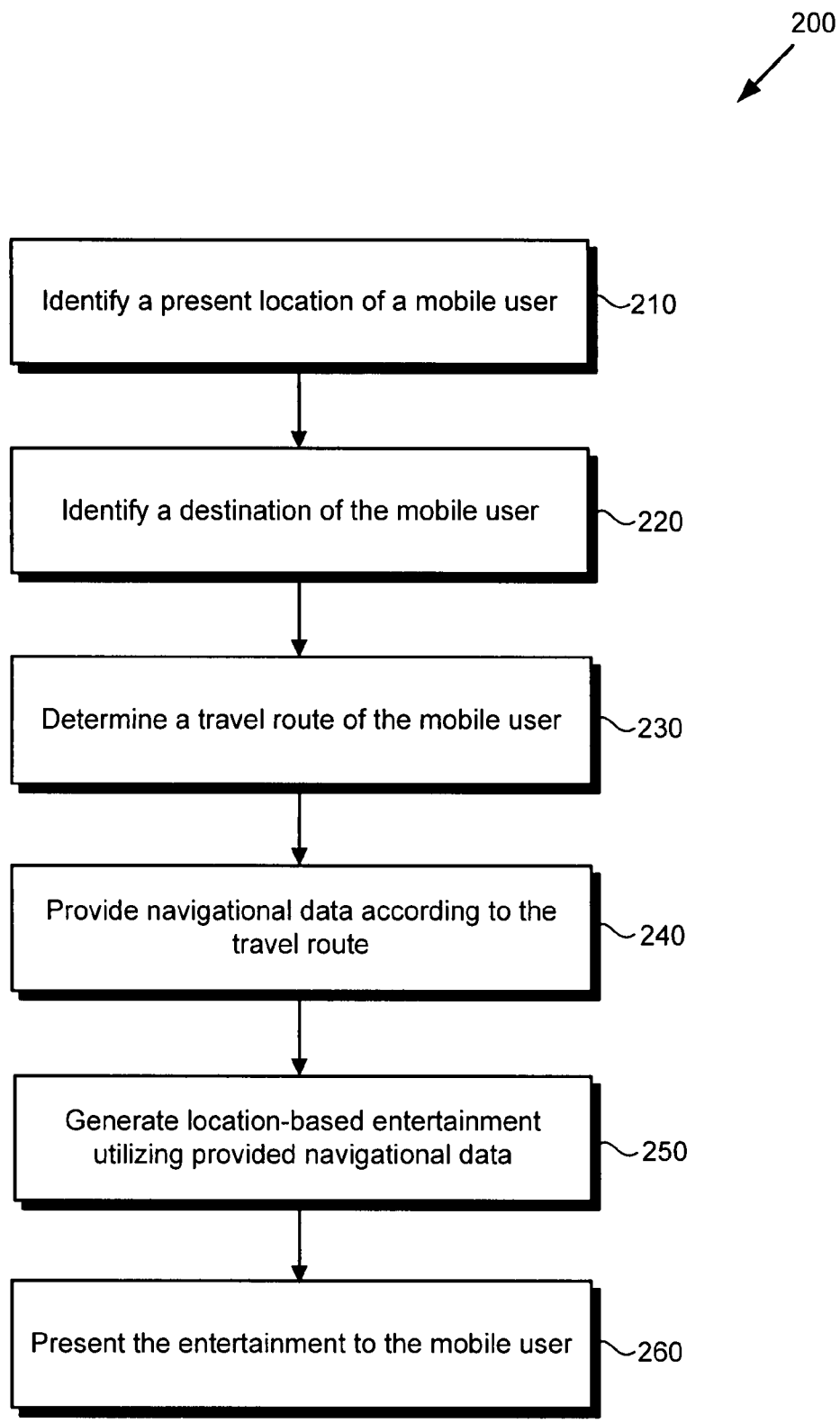
FIG. 2 shows a flowchart describing the steps, according to one embodiment of the present invention, by which location-based entertainment can be provided.

FIG. 2 shows flowchart 200 describing the steps, according to one embodiment of the present invention, by which location-based entertainment can be provided. Certain details and features have been left out of flowchart 200 that are apparent to a person of ordinary skill in the art. For example, a step may comprise one or more substeps or may involve specialized equipment or materials, as known in the art. While steps 210 through 260 indicated in flowchart 200 are sufficient to describe one embodiment of the present invention, other embodiments of the invention may utilize steps different from those shown in flowchart 200.

Referring to step 210 of flowchart 200 in FIG. 2, step 210 of flowchart 200 comprises identifying a present location of a mobile user. Such a location may be set manually or identified by reference to a position finding module, such as a GPS receiver, either included as an integrated component of a device capable of providing location-based entertainment, or through a wired or wireless communication link with a discrete navigational unit, as shown in FIG. 1.

Step 220 of flowchart 200 comprises identifying a destination of the mobile user. This is a preliminary step in a travel route determination process. Both the present location, and the destination constitute locations suitable as criteria for entertainment provided in subsequent step 250 or suitable for use in conjunction with the onboard entertainment.

Continuing with step 230 of FIG. 2 and system 100 of FIG. 1, step 230 of flowchart 200 comprises determining a travel route of the mobile user. A travel route can be determined through use of a routing module, such as routing module 106, in FIG. 1. As explained above, route determination may be accomplished either through an integrated component capable of providing location-based entertainment, or through a wired or wireless communication link with a discrete navigational unit, as shown in FIG. 1.

Next, at step 240 of flowchart 200, step 240 comprises providing navigational data according to the travel route. At step 250, an entertainment specific to at least one location of the travel route determined in step 230 is generated by entertainment unit 110, utilizing navigational data provided in previous step 240. Depending on additional selection criteria under the user's control, entertainment selection module 114 may be configured to select entertainment based on the present location of the device user, the destination designated in step 220, or any other point on the travel route determined in the previous step. This allows the mobile user to receive entertainment regarding a place recently visited, a place through which present travel is occurring, or an anticipated destination, for example.

At step 260 of flowchart 200, the entertainment is presented to the mobile user. As previously mentioned, the entertainment can comprise an audio presentation, video presentation, or interactive game, for example, specific to a location on the travel route determined in step 230. Correspondingly, presentation of the entertainment can be provided by use of a mobile communication device such as, for instance, a suitably configured mobile telephone, PDA, portable gaming console, digital media player, or portable computer. In that way, mobile user may be provided with entertainment content based on their present location, or to a point of interest relevant to their travel route.

Figure 3:
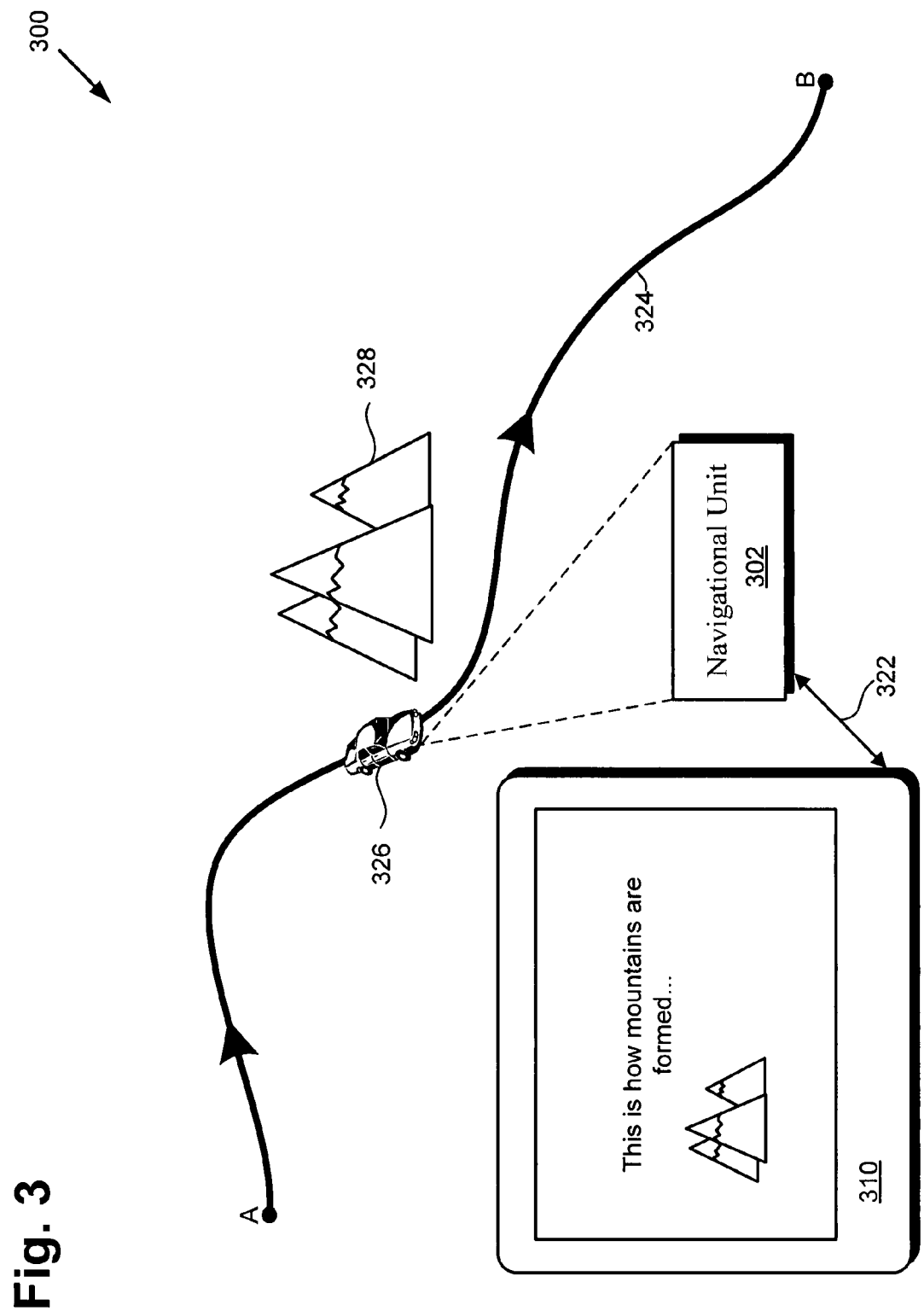
FIG. 3 shows a diagram for one exemplary route during which the system of FIG. 1 can be utilized to provide location-based entertainment, according to one embodiment of the present invention.

Turning now to FIG. 3, it shows a diagram for presentation of an interactive multimedia story specific to a natural landmark in proximity to a travel route. Referring to FIG. 3, the present example describes a road trip in vehicle 326 equipped with navigational unit 302, which corresponds to navigational unit 102, in FIG. 1. The exemplary road trip extends from beginning point A to destination B along travel route 324. Mountain range 328 is a point of interest in proximity to travel route 324, and serves as a focus of the location-based entertainment provided in this example.

The mobile user in the example of FIG. 3 is a child who is riding in the vehicle as a passenger, and is in possession of entertainment unit 110 for providing location-based entertainment, which in this example is incorporated in interactive system 310. Interactive system 310 is configured to receive navigational data from navigational unit 302 through wired connection 322.

The present exemplary road trip commences with the preliminary steps of activation of navigational unit 302, typically by starting vehicle 326, and connection of interactive system 310 to navigational unit 302 through wired connection 322.

Turning to flowchart 200 in FIG. 2 and diagram 300 in FIG. 3, step 210 is performed when navigational unit 302 identifies the present location of vehicle 326 at the outset of the trip, i.e. point A in FIG. 3. Step 220 is performed when the driver of vehicle 326 designates point B as a destination. Based upon the identified present location and the designated destination, navigational unit 302 determines a travel route corresponding to step 230 of flowchart 200, and provides navigational data according to step 240. In step 250, interactive system 310 generates an entertainment based on a location on the travel route and presents that entertainment in step 260. Steps 250 and 260 may be repeated, depending on the length of the trip, the length of the entertainment selected, and points of interest identified along the travel route, for instance. In the present example, as vehicle 326 approaches mountain range 328, interactive system 310 selects an interactive story describing the geology of mountain formation, and presents that selected entertainment to the child passenger. In other embodiments, entertainment unit 110 may be non-interactive and simply provide a story to the child passenger based on information about points of interest encountered while moving from point A to point B, such as post office, schools, football fields, etc.

Continuing on to FIG. 4 for another exemplary embodiment of the present invention, FIG. 4 shows a diagram corresponding to presentation of an interactive multimedia story based on a destination. FIG. 4 is used in conjunction with describing an errand utilizing vehicle 426 equipped with navigational unit 402. The exemplary errand is a trip from home to the post office along travel route 424, which includes left turn 428.

The mobile user in the example of FIG. 4 is a child accompanying a parent on the errand, the child being in possession of a device capable of providing location specific entertainment, which in this example is interactive system 410, corresponding to entertainment unit 110, in FIG. 1. Interactive system 410 includes a virtual steering accessory, shown in FIG. 4 as virtual steering wheel 418. Interactive system 410 is configured to receive navigational data from navigational unit 402 through wired connection 422.

Returning again to flowchart 200 in FIG. 2 and continuing with diagram 400 in FIG. 4, step 210 is performed when navigational unit 402 identifies the vehicle's present location at the outset of the trip, i.e. HOME in FIG. 4. Step 220 is performed when the parent identifies POST OFFICE as the destination. Based upon the identified present location and the identified destination, navigational unit 402 determines a travel route corresponding to step 230 of flowchart 200, and provides the navigational data to interactive system 410 in step 240. In step 250, interactive system 410 generates an entertainment specific to a location on the travel route, in this instance the destination, and presents that entertainment in step 260. In the present example, interactive system 410 selects an interactive Post Office story about mailing a letter, narrated by an animated figure, as shown in FIG. 4. Although in the present embodiment the story is narrated by a human like animated figure, in another embodiment the story might be narrated by one or more recognizable cartoon characters, for example, Mickey Mouse or Winnie the Pooh.

Virtual steering wheel 418 may be utilized by the child to make the post office story more interactive. For example, the story may include the instruction: "Follow the man with the envelope." At that prompt the animated character shown in FIG. 4 may move off to the left side of the screen as route 424 approaches left turn 428. The story may then ask: "Which way should we go to catch the man with the envelope?" In response to that prompt, the child might be encouraged to use virtual steering wheel to navigate a left hand turn corresponding to the parent being required to execute left turn 428, thus creating a shared driving experience.

As described in the foregoing, a system and method for providing location-based entertainment may utilize navigational data as selection criteria in supplying entertainment or in conjunction with a selected entertainment to a user of entertainment unit 110 or other members of a mobile audience. In that way the present invention provides content that is timely and relevant to a user's present location, destination, or other point of interest on a travel route. As a result, for example, a child may be provided with instructional diversion during a vehicle trip. Alternatively, a commuter may be provided with entertainment in the form of a game, for example, specific to an identified commuting route, and continuing throughout the commuting interval. By utilizing navigational data to guide selection of entertainment content, the present invention is capable of providing timely and topical entertainment to a user, without the user having to actively seek that content out.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. An entertainment system for providing location-based entertainment to a mobile user traveling from a first location to a second location, the entertainment system comprising:
   a navigational interface module configured to receive navigational data;
   an entertainment selection module configured to utilize the navigational data to generate a location-based entertainment content for the mobile user, the location-based entertainment content including a story for narration based on information about points of interest encountered while moving from the first location to the second location; and
   a presentation module configured to present the location-based entertainment content to the mobile user;
   wherein the mobile user is travelling from the first location to the second location using a vehicle, and wherein the entertainment system further comprises a virtual steering accessory for a virtual navigation of the vehicle in response to the story being narrated.

2. An entertainment system for providing location-based entertainment, the entertainment system comprising:
   a navigational interface module configured to receive navigational data;
   an entertainment selection module configured to utilize the navigational data to generate a location-based entertainment content for a user;
   a presentation module configured to present the location-based entertainment content to the user; and
   a virtual steering accessory for an interactive use of the location-based entertainment content.

3. The entertainment system of claim 2, wherein the entertainment selection module uses the navigational data as criteria for selecting the location-based entertainment content.

4. The entertainment system of claim 2, wherein the location-based entertainment is based on at least one location including one or more of a present location of the user, a past location of the user, a future location of the user, and a virtual location of the user.

5. The entertainment system of claim 2 further comprising a position finding module configured to provide the navigational data.

6. The entertainment system of claim 5, wherein the position finding module comprises a global positioning system (GPS) receiver.

7. The entertainment system of claim 2 further comprising a routing module configured to determine a travel route.

8. The entertainment system of claim 2, wherein the navigational data is provided by a vehicle navigation system.

9. The entertainment system of claim 2, wherein the entertainment system is one of a mobile telephone, a personal digital assistant (PDA), a portable gaming console, a digital media player, or a portable computer.

10. A method for use by an entertainment system for providing location-based entertainment to a mobile user traveling from a first location to a second location, the method comprising:
    identifying, using the entertainment system having a controller, a present location of the mobile user;
    identifying, using the entertainment system having the controller, a destination of the mobile user;
    determining, using the entertainment system having the controller, a travel route of the mobile user based on the present location and the destination of the mobile user;
    providing, using the entertainment system having the controller, navigational data according to the travel route;
    generating, using the entertainment system having the controller, a location-based entertainment content utilizing the navigational data for the mobile user, the location-based entertainment content including a story for narration based on information about points of interest encountered while moving from the first location to the second location; and
    presenting, using the entertainment system having the controller, the location-based entertainment content to the mobile user, wherein the presenting includes narrating the story;
    wherein the mobile user is travelling from the first location to the second location using a vehicle, and wherein the method further comprises supporting a virtual steering accessory for a virtual navigation of the vehicle in response to the story being narrated.

11. A method for use by an entertainment system for providing location-based entertainment, the method comprising:
    identifying, using the entertainment system having a controller, a present location of a mobile user;
    identifying, using the entertainment system having the controller, a destination of the mobile user;
    determining, using the entertainment system having the controller, a travel route of the mobile user based on the present location and the destination of the mobile user;
    providing, using the entertainment system having the controller, navigational data according to the travel route;
    generating, using the entertainment system having the controller, a location-based entertainment content for a user utilizing the navigational data;
    presenting, using the entertainment system having the controller, the location-based entertainment content to the user; and
    receiving, using the entertainment system having the controller, a user interaction from the user using a virtual steering accessory in response to presenting the location-based entertainment content.

12. The method of claim 11, wherein the location-based entertainment content is generated by using the navigational data as criteria for selecting the location-based entertainment content.

13. The method of claim 11, wherein identifying comprises global positioning system (GPS) location finding.

14. The method of claim 11, wherein determining is performed utilizing a vehicle navigation system.

15. The method of claim 11, wherein the location-based entertainment content includes an interactive presentation or game.

* * * * *